United States Patent [19]

Vogl et al.

[11] 4,414,934

[45] Nov. 15, 1983

[54] RECIPROCATING PISTON-TYPE INTERNAL COMBUSTION ENGINE WITH IMPROVED BALANCING SYSTEM

[75] Inventors: Norbert M. Vogl, Milwaukee; Ronald R. Gaulke, Waukesha; Joseph R. Harkness, Germantown, all of Wis.

[73] Assignee: Briggs & Stratton Corporation, Wauwatosa, Wis.

[21] Appl. No.: 248,908

[22] Filed: Mar. 30, 1981

[51] Int. Cl.³ .............................................. F02B 75/06
[52] U.S. Cl. .................................... 123/192 B; 74/603
[58] Field of Search ....................... 123/192 R, 192 B; 74/603, 604

[56] References Cited

U.S. PATENT DOCUMENTS

| 3,415,237 | 12/1968 | Harkness ........................ | 123/192 B |
| 3,903,995 | 9/1975 | Irgens ............................. | 123/192 B |
| 4,074,589 | 2/1978 | Nakamura et al. ............. | 74/604 |
| 4,125,036 | 11/1978 | Nakamura et al. ............. | 123/192 B |
| 4,174,698 | 11/1979 | Dupin ............................. | 123/192 B |
| 4,290,395 | 9/1981 | Sakano et al. .................. | 123/192 B |

FOREIGN PATENT DOCUMENTS

| 217244 | 2/1961 | Austria ............................ | 123/192 B |
| 886890 | 11/1971 | Canada ........................... | 123/192 B |
| 1935121 | 1/1971 | Fed. Rep. of Germany ... | 123/192 B |

OTHER PUBLICATIONS

Lombardini, "Lombardini Motors 710–720 and 715–725," Aug. 1975.
Nakano et al., "Present and Future of Countermeasures for Noise and Vibration Problems of Small Passenger Cars," *Japanese Society of Automotive Engineer Review*, vol. 33, No. 12 (Dec. 1979), pp. 1003–1011.
Nakano et al. "Present and Future of Countermeasures for Noise and Vibration Problems of Small Passenger Cars," *Japanese Society of Automotive Engineer Review*, No. 4 (Mar., 1981).

*Primary Examiner*—Craig R. Feinberg
*Assistant Examiner*—W. R. Wolfe
*Attorney, Agent, or Firm*—Andrus, Sceales, Starke & Sawall

[57] ABSTRACT

An engine-balancing system for balancing the primary forces of single cylinder and in phase in-line multi-cylinder piston engines. The balancing system includes rotary, auxiliary counterweights mounted on the exterior of the engine block for rotation about fixed axes that are parallel to and spaced from the crankshaft axis and positioned at diametrically opposite sides thereof. The combined centrifugal forces of these auxiliary counterweights are preferably equal to that of the conventional crankshaft-carried counterweights. The auxiliary counterweights are drivingly-connected with the crankshaft by a flexible double-sided timing belt that is trained over sprockets of the same diameter coaxially fixed with respect to the crankshaft and with each of the pair of auxiliary counterweights so that the pair of auxiliary counterweights turn at the same speed as, but in the opposite direction from that of the crankshaft. The auxiliary counterweights coact with one another and with the conventional crankshaft-carried counterweight to significantly diminish vibration of the engine incident to its operation.

5 Claims, 8 Drawing Figures

RECIPROCATING PISTON-TYPE INTERNAL COMBUSTION ENGINE WITH IMPROVED BALANCING SYSTEM

BACKGROUND OF THE PRESENT INVENTION

This invention relates to internal combustion engines of the reciprocating piston-type, and more particularly to the provision of an improved balancing system designed to eliminate, or at least greatly reduce, vibration of the engine incident to its operation.

Internal combustion engines of the reciprocating piston-type require an arrangement for balancing the so-called primary vibration-causing inertial forces that result from reciprocation of their pistons and rotation of their crankshafts. These primary inertial forces are the result of the force required to start and stop the piston twice each revolution of the crankshaft. An engine balancing system is especially needed in small single cylinder and twin cylinder engines typically used for gardening tractors and riding mowers because if these inertial forces are not eliminated, or at least greatly reduced, objectional vibrations are transmitted to the operator of such machines, and to other parts of the machine.

As is well known, crankshaft-carried counterweights are incorporated in engines of this type in an attempt to reduce the primary vibration-causing forces. These crankshaft-carried counterweights are disposed 180° opposite the crankpin of a piston so that when the crankshaft is rotated they produce centrifugal force having a vertical component that is in line with the piston axis and diametrically opposite the inertial force of the piston. In a condition of 100% overbalance these vertical force components substantially cancel out the primary vertical forces of the piston. However, the conventional crankshaft-carried counterweights also produce horizontal force components during rotation that are at right angles to the piston axis which at a condition of 100% overbalance produce excessive vibrations in the horizontal directions. As a result, engines of this type conventionally utilize crankshaft-carried counterweights that produce a condition of about 50% overbalance. Although not totally balancing either the vertical or the horizontal forces this condition of 50% overbalance produces tolerable vibrations for the system. It is desirable to provide a balancing system which would substantially balance or cancel out both the vertical and horizontal remaining primary vibration-causing forces. As noted above, the term "vertical" used in the present application refers to forces that are in line with the piston axis, and the term "horizontal" refers to forces that are normal to the piston axis.

Various balancing arrangements can be found in the prior art which attempt to balance or cancel out these primary forces, and yet meet the requirements of a practical and reliable engine balancing system which would not lead to extensive redesign of the engine. One such arrangement can be found in Harkness, U.S. Pat. No. 3,415,237 which is assigned to the assignee of the present invention. Harkness utilizes a pair of auxiliary counterweights mounted coaxially with the crankshaft on the exterior of the crankcase. The auxiliary counterweights are driven at crankshaft speed but in the opposite direction so as to coact with the crankshaft-carried counterweights to balance both the vertical and horizontal components of the primary inertial piston forces. However, the Harkness balancing system requires the use of extensive gear trains between the crankshaft and camshaft to drive the auxiliary counterweights. These gear trains are relatively expensive to manufacture and assemble, and further result in objectional noise during operation of the engine. There is also the problem of accommodating such gear trains in the limited space available for small compact engines of the type herein concerned. It is therefore desirable to provide an improved mechanism for driving the auxiliary counterweights of a Harkness-type balancing system.

In Nakamura et al, U.S. Pat. Nos. 4,125,036 and 4,074,589, there is disclosed a four cylinder engine having a pair of rotary auxiliary counterweights which rotate about axes that are spaced from the crankshaft and located within the engine block. These auxiliary counterweights are driven by a belt to rotate in opposite directions at twice the speed of rotation of the crankshaft. The balancing system of the two aforesaid Nakamura et al patents, however, is not concerned with balancing the primary inertial forces, but rather with balancing the secondary inertial forces which are particularly large on four cylinder engines. As is well known, these secondary forces are introduced by the geometry of the connecting rod and occur at twice the crankshaft speed. To that end, the auxiliary counterweights of the Nakamura et al patents rotate in opposite directions and at twice the speed of rotation of the crankshaft. Since the auxiliary counterweights rotate in opposite directions, the horizontal components of their centrifugal force vectors at any instant cancel each other out so as to avoid introducing any undesirable lateral forces into the system. However, the fact that these auxiliary counterweights rotate in opposite directions at twice the speed of the crankshaft prevents the auxiliary counterweights of the Nakamura et al patents from compensating for any primary forces. The teachings of the Nakamura et al patents thus lead away from the solution of the problem relating to balancing primary forces to which the present invention is specifically concerned.

Another balancing system is shown in German Pat. No. 1,935,121 which shows a four cylinder engine that incorporates a belt-driven compensating shaft that is spaced from and parallel to the crankshaft, and has a pair of auxiliary counterweights mounted thereon. The auxiliary counterweights are mounted outside the crankcase and rotate at the same speed as the crankshaft. The balancing system of the German patent, however, is not concerned with balancing the primary inertial forces, but only with balancing the torsional moments produced by multi-cylinder engines. Since the pistons of the four cylinder engine described in the German patent are offset from one another, they will produce an additional torque or moment that tends to cause engine vibration. This torque or moment may be present in some multi-cylinder piston engines, for example the four cylinder engine of the aforesaid German patent and in-line, uneven-firing twin cylinder engines. Such vibration-producing moments, however, are not present in single cylinder and in-line in phase twin cylinder piston engines of which the present invention is concerned. The auxiliary counterweights mounted on the compensating shaft as disclosed in the aforesaid German patent are thus designed to substantially balance or cancel this added torque or moment by producing another torque or moment in the opposite direction. If such a system were incorporated with single or in-line even-firing twin cylinder engines, it would not balance the primary inertial forces created by such an engine, but in fact would create an additional undesirable torque or moment instead. The teachings of the German patent thus lead away from a solution of balancing primary inertial forces to which the present invention is specifically directed.

The series 700 single cylinder diesel engine produced by Lombardini Motors, an Italian engine manufacturer, incorporates yet another type of balancing system. The series 700 engine includes a single auxiliary counterweight that is mounted on a shaft spaced from and parallel to the crankshaft. The auxiliary counterweight is rotated at the same speed as the crankshaft by means of a gear train located between its shaft and the crankshaft. The auxiliary counterweight, however, is mounted inside the engine block which creates interior design problems for the engine. Also, since there is only one auxiliary counterweight and it is offset from the crankshaft axis, a torque or moment will be created which will cause the engine to vibrate with a rocking motion. Thus, if the Lombardini balancing system was incorporated with single cylinder or in-line even-firing twin cylinder piston engines, it would create an additional undesirable torque or moment. The Lombardini system therefore does not solve the problem of balancing primary inertial forces to which the present invention is specifically directed.

SUMMARY OF THE INVENTION

The balancing system of the present invention provides additional or auxiliary counterweights which supplement the conventional crankshaft-carried counterweights. The auxiliary counterweights are mounted on the engine block for rotation about fixed axes that are spaced from each other and preferably equally spaced from and parallel with the crankshaft axis. These auxiliary counterweights coact with one another and with the conventional crankshaft carried counterweight to substantially balance or cancel out the primary inertial forces of reciprocating piston-type internal combustion engines. The auxiliary counterweights of the present invention are particularly adapted for use with single cylinder and in phase in-line twin cylinder piston engines to greatly reduce vibration of these engines while running.

An endless flexible motion transmitting element, preferably a double-sided timing belt like that marketed by the Power Transmission Division of Uniroyal, Inc., Middlebury, Conn., drivingly connects a pair of auxiliary counterweights with the crankshaft in such a way that these auxiliary counterweights both rotate at crankshaft speed but in the direction opposite to that of the crankshaft. Moreover, the dimensions and weights of the auxiliary counterweights are preferably such that the combined inertial forces resulting from rotation thereof is equal to that of the conventional crankshaft-carried counterweight. As a result, the proper augular disposition of the auxiliary counterweights cause their centrifugal force to coact with that of the conventional crankshaft-carried counterweight to offset the primary vertical inertial forces acting along the axis of the piston and resulting from its reciprocation. Also, since the direction of rotation of both auxiliary counterweights is opposite that of the crankshaft and at crankshaft speed, the combined effect of the centrifugal force of the auxiliary counterweights opposes and equals that of the conventional crankshaft-carried counterweight substantially at the point where the piston passes through the midpoint of its reciprocating motion. The result is that the primary horizontal inertial forces acting normal to the axis of the piston are balanced or cancelled out.

Since the shafts of auxiliary counterweights are preferably positioned diametrically opposite one another and equally spaced from and parallel with the crankshaft axis, they do not introduce any additional torque or moment to the engine. The summation of the moments produced by the conventional counterweights and the auxiliary counterweights is zero and the summataion of their centrifugal forces acts essentially along the path of the combined center of gravity of all pistons. Also, since the auxiliary counterweights are preferably externally mounted outside the crankcase, they can be incorporated in existing engines with only minor modifications thereof. Therefore, extensive redesigning of the crankcase to provide space for the auxiliary counterweights is not necessary.

The present invention thus provides an improved balancing system for effectively balancing the primary inertial forces that cause objectionable vibration in single cylinder or in-line in phase multi-cylinder piston engines without introducing any additional torque or moment into the system.

Other advantages will appear in the course of the following description.

BRIEF DESCRIPTION OF THE DRAWINGS

The drawings illustrate the best modes presently contemplated of carrying out the invention.

In the drawings.

DESCRIPTION OF THE PREFERRED EMBODIMENTS

Figure 1:
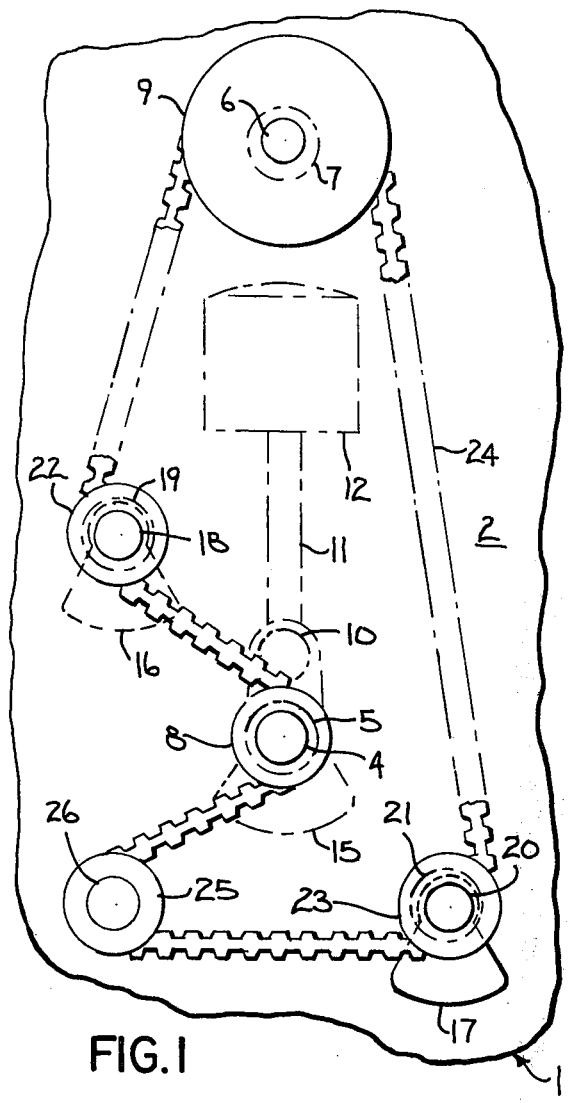
FIG. 1 is a fragmentary view in elevation of one end of a single cylinder piston engine incorporating the improved balancing system of the present invention.
Figure 2:
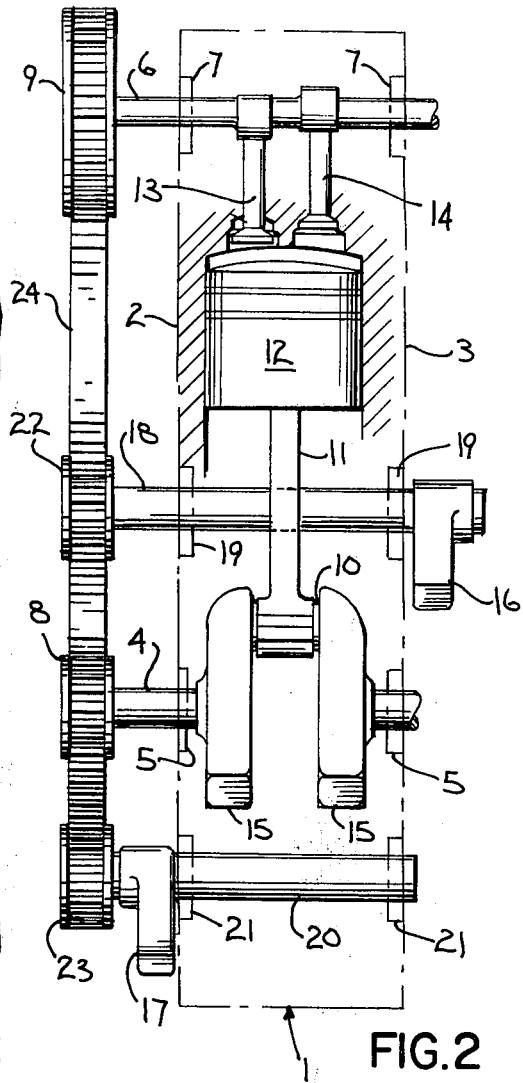
FIG. 2 is a somewhat schematic view in vertical section taken through the crankcase of the engine of FIG. 1 illustrating one form of the balancing system for use with a single cylinder piston engine.
Figure 3:
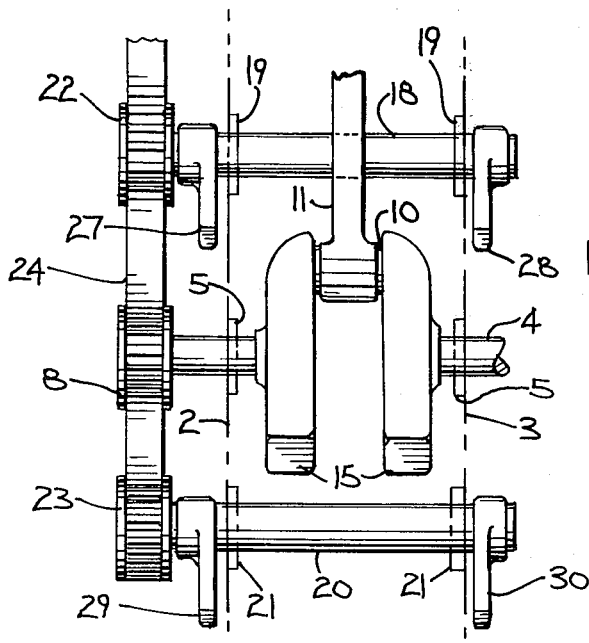
FIG. 3 is a fragmentary view similar to FIG. 2 illustrating another form of the balancing system for use with single cylinder piston engines.

Referring now to the drawings, FIGS. 1–3 schematically illustrate a single cylinder four-stroke engine of the type typically used on small tractors or mowing machines. The engine comprises a block or crankcase 1 having opposite end walls 2 and 3 which support its crankshaft 4 in suitable bearings 5 for rotation on a horizontal axis, and a camshaft 6 which is also supported in bearings 7 by end walls 2 and 3 for rotation on a horizontal axis parallel to and above the axis of crankshaft 4.

As seen in FIG. 2, one end of crankshaft 4 projects beyond end wall 2 and a toothed pulley or sprocket 8 is affixed thereto in any conventional manner. One end of camshaft 6 also projects beyond end wall 2 and has a toothed pulley or sprocket 9 affixed thereto in any conventional manner in vertical alignment with the sprocket 8 of crankshaft 4.

The crankshaft 4 has a conventional crankpin 10, and a connecting rod 11 drivingly connects the crankpin 10 with a piston 12 in the usual way. The camshaft 6 has the customary intake valve 13 and exhaust valve 14 driven thereby above piston 12 in the cylinder portion of the engine for operation in the conventional manner. The crankshaft 4 also carries the conventional counterbalance arrangement for partially balancing or cancelling out the primary vertical forces created during piston reciprocation. This conventional counterbalance arrangement is provided by a pair of counterweights 15 arranged 180° opposite the crankpin 10 of piston 12. The counterweights 15 may be arranged eccentric to the crankshaft axis and symmetrical with respect to the cylinder axis so that their combined center of gravity is diametrically opposite the crankpin 10. As a result the crankshaft-carried counterweights 15 have a centrifugal force vector that extends diametrically opposite the crankpin 10. Thus, the rotation of the crankshaft-carried counterweights 15 produces centrifugal force having one component that acts along the cylinder axis in opposition to the acceleration and deceleration forces of the piston assemblage. By supplying the appropriate weights for the crankshaft-carried counterweights 15 the vertical component of their combined centrifugal forces can be made to substantially balance or cancel out the vertical forces of the piston assemblage. This is typically called a condition of 100% overbalance. It should be noted that the "over" in the word overbalance refers to the amount by which the centrifugal force due to the counter balances exceeds the centrifugal force of the crankpin and that part of the connecting rod that moves with substantially the same orbital motion as the crankpin.

The "percentage" is the ratio of the overbalance force to the inertial force of the piston at top dead center. The upper part of the connecting rod is considered to move with the piston, so its inertial force is included with that of the piston in calculating this "percentage".

As the crankshaft 4 is rotated the combined centrifugal force of the crankshaft-carried counterweights 15 also has a second component at right angles to the cylinder axis. If the combined weights of the crankshaft-carried counterweights 15 is large enough to approach a condition of 100% overbalance, the combination of their horizontal components of centrifugal force becomes undesirably large and excessive vibration-producing forces result. As a result, engines of the type herein concerned generally achieve a condition of about 50% overbalance. Although this condition does not totally balance or cancel out the vertical and horizontal forces of the piston assemblage, it does result in a substantial decrease in the horizontal and vertical vibration-producing forces. However, the remaining vibrating primary forces may still be considered excessive, particularly in engines of the type herein concerned.

As a unique feature the present invention provides an engine balancing system for balancing the primary vertical and horizontal forces developed in reciprocating piston-type internal combustion engines. The engine balancing system of the present invention preferably comprises a pair of identical, rotary, auxiliary counterweights 16 and 17 located on the exterior of the engine crankcase 1. The auxiliary counterweight 16 is mounted on a shaft 18 that extends through the crankcase 1 and is supported in bearings 19 by end walls 2 and 3 for rotation on an axis parallel to crankshaft 4. The auxiliary counterweight 17 is mounted on a shaft 20 that also extends through crankcase 1 and is supported in bearing 21 by end walls 2 and 3 for rotation on an axis parallel to but on the opposite side of crankshaft 4 from that of shaft 18. As seen in FIG. 1, shafts 18 and 20 are in a common plane that contains the crankshaft 4. The shafts 18 and 20 are also preferably spaced at equal distances from the crankshaft axis and thus the auxiliary counterweights 16 and 17 are positioned at diametrically opposite sides thereof. As seen best in FIG. 2, one end of shaft 18 projects beyond end wall 3 so that counterweight 16 may be mounted adjacent to wall 3 but on the exterior of engine crankcase 1. The opposite end of shaft 18 mounts a toothed pulley or sprocket 22 in any conventional manner so that as seen in FIG. 2 it is in alignment with the sprockets 8 and 9 of crankshaft 4 and camshaft 6, respectively.

One end of shaft 20 also projects beyond end wall 2 to enable auxiliary counterweight 17 to be mounted thereon adjacent to wall 2 but exterior of the engine crankcase 1. This end of shaft 20 also enables a toothed pulley or sprocket 23 to be mounted thereon in any conventional manner, and as seen in FIG. 2, the sprocket 23 is in alignment with sprocket 22 of shaft 18 as well as sprockets 8 and 9 of crankshaft 4 and camshaft 6, respectively. It should be noted that auxiliary counterweight 17 is positioned between its respective sprocket 23 and end wall 2 of engine crankcase 1. Each of the auxiliary counterweights 16 and 17 has a hub which is fixedly mounted to its respective shaft 10 or 20 for rotation therewith.

An endless flexible motion transmitting element 24, preferably a double-sided timing belt like that marketed by the Power Transmission Division of Uniroyal, Inc., Middlebury, Conn., drivingly connects the pair of externally mounted auxiliary counterweights 16 and 17 with crankshaft 4. The timing belt 24 is trained around sprockets 8, 9, 22 and 23 as shown in FIG. 1 so that the auxiliary counterweights 16 and 17 both rotate in a direction opposite to that of crankshaft 4. As seen in FIG. 1, sprockets 22 and 23 have diameters and numbers of teeth which are identical to that of the crankshaft sprocket 8. As a result, auxiliary counterweights 16 and 17 not only rotate in a direction opposite to that of crankshaft 4 but also rotate at crankshaft speed. To obtain proper belt tension, timing belt 24 passes about a toothed idler pulley or sprocket 25 which is freely journaled on one end of a stub shaft 26. Stub shaft 26 projects from end wall 2 of engine crankcase 1, and idler sprocket 25 is mounted thereon so that it is in alignment with sprockets 8, 9, 22 and 23. Such an arrangement of pulleys or sprockets in one plane, as shown in FIG. 2, provides for a relatively short engine design and does not substantially increase the overall length of engines of the type herein concerned. Compensation for belt wear may be provided by any conventional manner such as by mounting stub shaft 26 in an eccentrically bored adjustment sleeve (not shown) which will allow stub shaft 26 to be moved and locked in any desired position to maintain proper belt tension.

In a preferred form, the dimensions and weight of the identical externally mounted auxiliary counterweights 16 and 17 are such that their combined centrifugal force resulting from rotation thereof equals that of the conventional crankshaft-carried counterweight. Hence, if the crankshaft-carried counterweights 15 are selected to provide a condition of 50% overbalance, and the combined centrifugal force of auxiliary counterweights 16 and 17 equals that of the conventional crankshaft-carried weights 15, then the engine is effectively at a condition of 10% overbalance.

Figure 6:
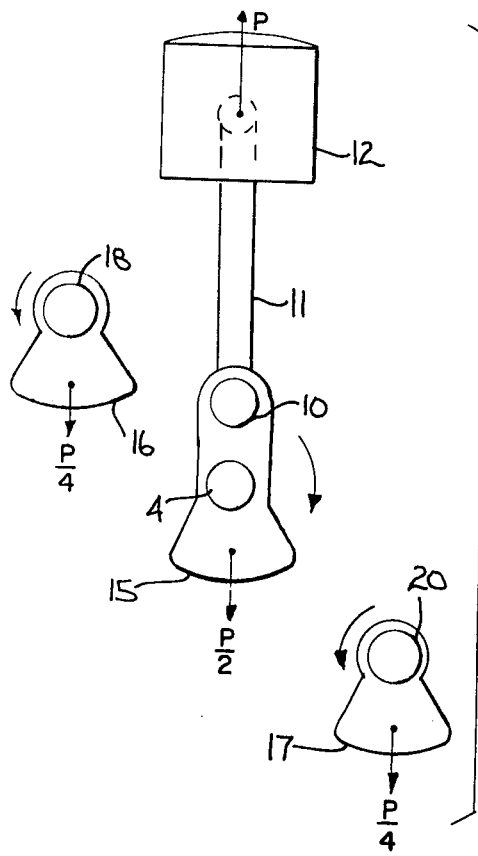
FIG. 6 is a schematic view of a single cylinder piston engine illustrating the force vectors of the balancing system of the present invention when the piston is in its top dead center position.
Figure 7:
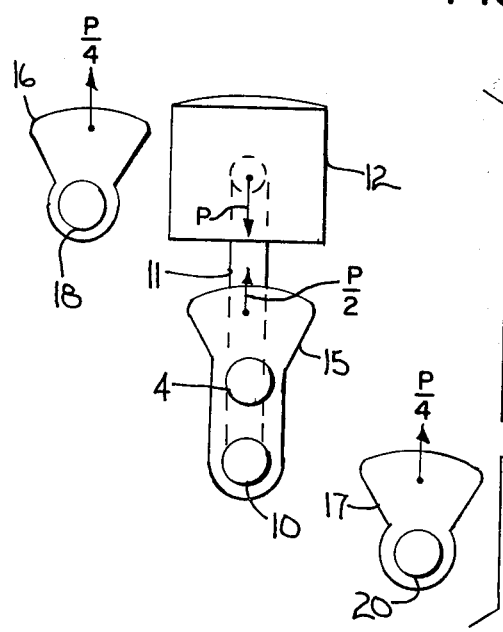
FIG. 7 is a schematic view similar to FIG. 6 illustrating the force vectors when the piston is in its bottom dead center position.

Auxiliary counterweights 16 and 17 are angularly disposed on their respective shafts 18 and 20 so that when the piston 12 is in its top dead center position they are oriented in a diametrically opposite position or downwardly, as shown in FIG. 6, to match the orientation of the crankshaft-carried counterweights 15. Thus, when the piston 12 is at its top dead center position, the net resultant centrifugal force vector of the auxiliary counterweights 16 and 17, as well as the crankshaft-carried counterweights 15, is positioned along the cylinder axis to substantially balance or cancel out the vertical force vector of the piston assemblage acting upwardly along the cylinder axis. When the piston 12 is in its bottom dead center position, as shown in FIG. 7, the crankshaft-carried counterweights 15 as well as the auxiliary counterweights 16 and 17 will have rotated 180° from the position shown in FIG. 1 so that their net resultant centrifugal force vector is acting toward the cylinder head along the cylinder axis while the force vector of the piston assemblage is acting away from the cylinder head along the cylinder axis. If the combined effect of the crankshaft-carried counterweights 15 and the auxiliary counterweights 16 and 17 provide for a condition of 100% overbalance, as is preferred, the vertical forces present when the piston 12 is in its bottom dead center position are substantially balanced or cancelled out. Hence, auxiliary counterweights 16 and 17, and crankshaft-carried counterweights 15 coact to offset the primary vertical inertial forces acting along the axis of piston 12 resulting from its reciprocation.

Figure 8:
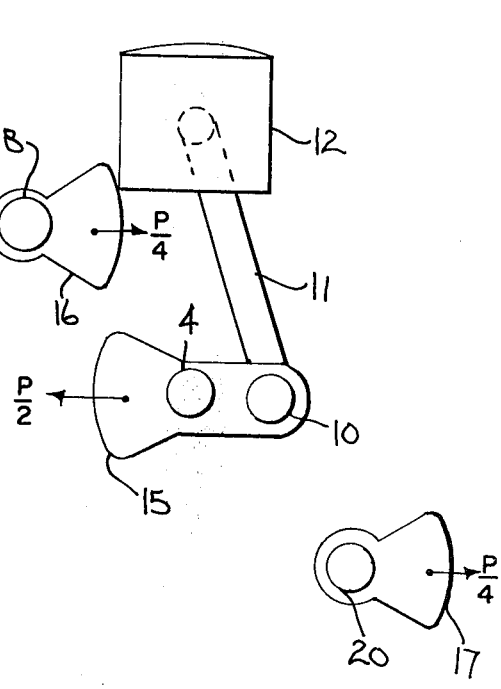
FIG. 8 is a schematic view similar to FIGS. 6 and 7 illustrating the force vectors when the piston is substantially at the midpoint of its stroke.

Also, since the direction of rotation of both externally mounted auxiliary counterweights 16 and 17 is opposite that of crankshaft 4 and at crankshaft speed the combined effect of the auxiliary counterweights 16 and 17 opposes and equals that of the conventional crankshaft-carried counterweights 15 as the crankpin 10 is angularly at the midpoint between top and bottom dead centers. This is illustrated in FIG. 8 where the piston is shown substantially at the midpoint of its stroke. As a result, the horizontal components of the centrifugal force of the crankshaft-carried counterweights 15 are also substantially balanced or cancelled out. For example, if the crankshaft 4 is rotating clockwise as shown in FIG. 1 and piston 12 has moved substantially to the midpoint of its downward stroke, the crankshaft-carried counterweights 15 will also have rotated 90° in a clockwise direction so that they will be extending laterally and to the left of crankshaft 4 as seen in FIG. 1. At substantially the same time auxiliary counterweights 16 and 17 will have rotated 90° in a counterclockwise direction so that they are extending laterally and to the right of their respective shafts 18 and 20, as seen in FIG. 8. Thus, the centrifugal force vector of the crankshaft-carried counterweights 15 will be directed laterally to the left, and the centrifugal force vectors of the auxiliary counterweights 16 and 17 will be directed laterally to the right. Since the centrifugal force of auxiliary counterweights 16 and 17 equals that of crankshaft-carried counterweights 15, the combined centrifugal force resulting from the rotation of counterweights 16 and 17 equals that of the crankshaft-carried counterweights 15. As a result, the centrifugal force vectors of auxiliary counterweights 16 and 17 are extending in a direction opposite the force vector of the crankshaft-carried counterweights 15 and thus substantially balance or canel out one another to eliminate vibration-producing lateral forces. Correspondingly, when piston 12 passes through the approximate midpoint of the upward stroke of its reciprocating cylce the crankshaft-carried counterweights 15 will have rotated clockwise to a position which is 270° from that shown in FIG. 1, and auxiliary counterweights 16 and 17 will have rotated counterclockwise to a position 270° from that shown in FIG. 1. At this point in time the centrifugal force vector of the crankshaft-carried counterweights 15 is directed laterally and to the right as seen in FIG. 1, and the centrifugal force vectors of the auxiliary counterweights 16 and 17 are directed laterally to the left. Once again, since the force vectors are equal and are directed oppositely, they substantially cancel one another to eliminate vibration-producing lateral forces.

It should also be noted that the auxiliary counterweights 16 and 17 of the present invention do not introduce any additional torque or moments that tend to cause engine vibration. Since the auxiliary counterweights 16 and 17 are disposed symmetrically about the crankshaft axis and cylinder axis and rotate in a direction opposite to that of crankshaft 4 the single cylinder engine of FIGS. 1 and 2 is properly balanced so that no additional moments are introduced. The summation of the moments produced by the conventional crankshaft-carried counterweights 15 and the auxiliary counterweights 16 and 17 is zero, and the summation of their centrifugal forces acts essentially along the path of the center of gravity of the piston 12.

FIG. 3 shows an alternate form of the engine-balancing system of the present invention which may be utilized with single cylinder engines. The arrangement shown in FIG. 3 is substantially identical to that shown in FIG. 2 except that in FIG. 3 the shafts 18 and 20 project beyond both end walls 2 and 3, and there are now four identical externally mounted auxiliary counterweights 27–30. Auxiliary counterweight 27 is securely mounted on shaft 18 between sprocket 22 and end wall 2, and auxiliary counterweight 28 is securely mounted on the projecting portion at the opposite end of shaft 18 externally of end wall 3. Similarly, auxiliary counterweight 29 is securely mounted on shaft 20 between sprocket 23 and end wall 2, and auxiliary counterweight 30 is mounted on the projecting portion at the opposite end of shaft 20 externally of end wall 3. As previously described, shafts 18 and 20 are adapted for rotation about fixed axes that lie in a common plane with the crankshaft axis. Thus, shafts 18 and 20 are diametrically opposite one another, and auxiliary counterweights 27–30 are positioned symmetrically with respect to the cylinder axis. The dimensions and weight of the identical externally mounted auxiliary counterweights 27–30 are such that the combined centrifugal force resulting from rotation thereof equals that of the conventional crankshaft-carried counterweights 15. However, in the embodiment shown in FIG. 3 each auxiliary counterweight 27–30 produces one-half the centrifugal force of each auxiliary counterweight 16 and 17 shown in FIG. 2. However, as is readily apparent their combined centrifugal force equals that of the crankshaft counterweights 15. Hence, the auxiliary counterweights 27–30 shown in FIG. 3 operate in the same manner as previously described for auxiliary counterweights 16 and 17 of FIG. 2, and coact with the crankshaft-carried counterweights 15 to substantially balance or cancel out the vertical and horizontal primary inertial forces of the piston assemblage. Similarly, the use of the four symmetrically positioned counterweights 27–30 of FIG. 3 instead of the two counterweights 16 and 17 of FIG. 2 does not produce any additional torque or moments to the system.

As is now apparent, any system of contra-rotating counterweights, mounted on shafts lying in a plane that also contains the axis of the crankshaft, can have their counterweights so sized and disposed with respect to the end walls 2 and 3 of the engine, that if their combined centrifugal forces lies in the plane perpendicular to the crankshaft and containing the center of gravity of the piston, and if their total centrifugal force is equal to that of the crankshaft counterweights, they will produce neither horizontal forces nor rocking moments. If the net centrifugal force of all counterweights provides "100% overbalance", then all primary forces are substantially eliminated.

As an illustration of the scope of this invention, shaft 18 could be twice as far from crankshaft 4 as is shaft 20, and counterweight 16 provide only one half as much centrifugal force as counterweight 16, provided that counterweight 16 was also located twice as far (along shaft 18) from the piston axis as is counterweight 17. This would satisfy the requirement that the sum of the centrifugal forces of counterweights 16 and 17 lie in the plane containing the piston bore. The sizes of counterweights 16 and 17 would of course need to be such that their combined centrifugal forces would equal that of the centrifugal forces of the crankshaft-carried counterweights 15.

The value of such flexibility in the placement of counterweights and their shafts would be apparent to engine designers, who often must struggle to place balance weights and shafts in symmetrical locations but could more easily place them unsymmetrically, even though doing so still places restraints on the size and axial locations of the weights.

Figure 4:
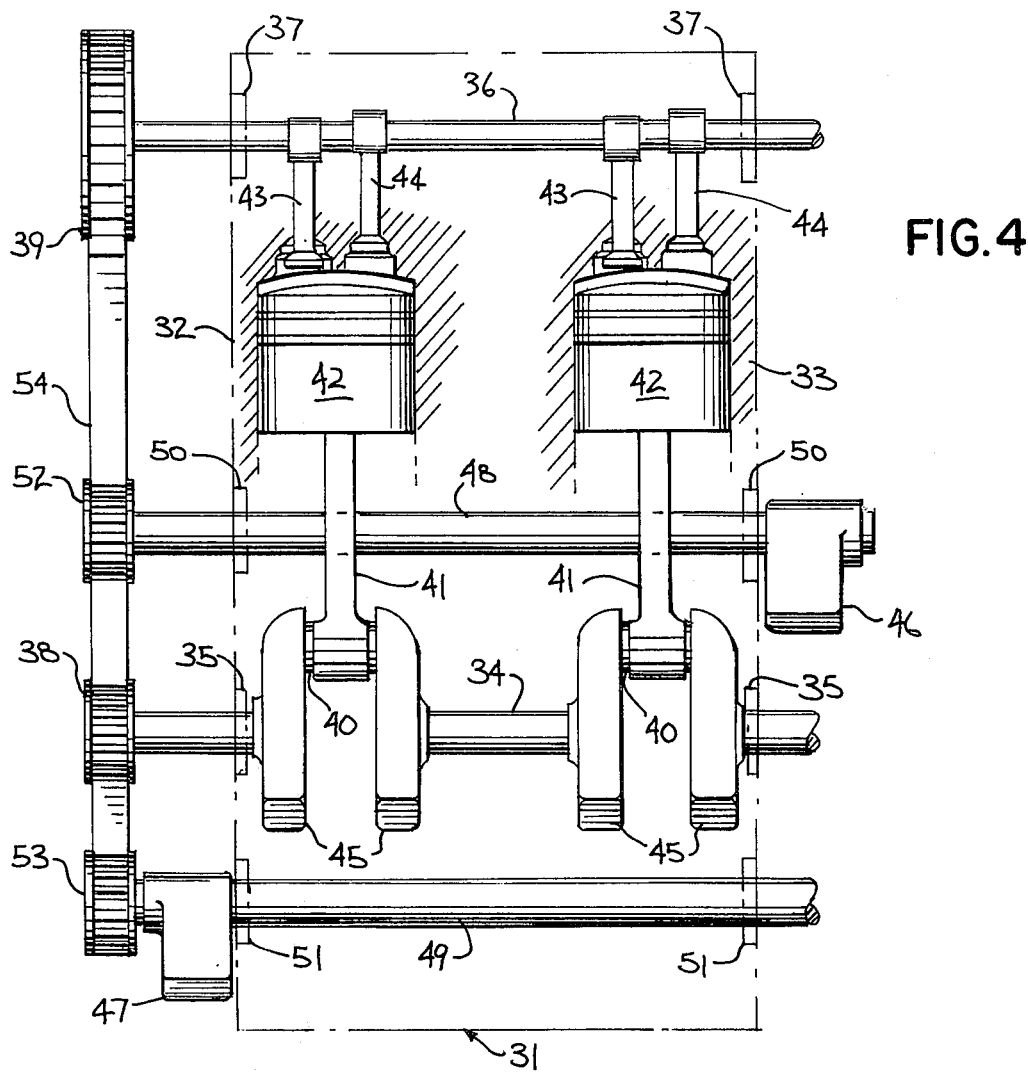
FIG. 4 is a somewhat schematic view similar to FIG. 2 in vertical section taken through the crankcase of an in phase in-line twin cylinder piston engine incorporating the present invention.

Referring now to FIG. 4, there is shown another form of an engine balancing system of the present invention which may be utilized with twin cylinder engines. FIG. 4 schematically illustrates an in-line, pistons in phase twin cylinder engine comprising a crankcase 31 having opposite end walls 32 and 33 which support a crankshaft 34 in suitable bearings 35 for rotation on a horizontal axis, and a camshaft 36 which is also supported in bearing 37 by end walls 32 and 33 for rotation on an axis parallel to and displaced from the axis of crankshaft 34. One end of crankshaft 34 projects beyond end wall 32 and a toothed pulley or sprocket 38 is affixed thereto. One end of camshaft 36 also projects beyond end wall 32 and has a toothed pulley or sprocket 39 affixed thereto in alignment with the sprocket 38 of crankshaft 34.

Crankshaft 34 has a pair of conventional crankpins 40 and a pair of connecting rods 41 link crankpins 40 with a pair of pistons 42 in the usual manner to provide an in-line phase twin cylinder engine. Camshaft 36 drives the customary intake valves 43 and exhaust valves 44 above pistons 42 in the cylinder portion of the engine for operation in the conventional manner. Crankshaft 34 also carries the conventional counterbalance arrangement for partially balancing and cancelling out the primary vertical forces created by piston reciprocation. This conventional counterbalance arrangement is provided by a pair of equal counterweights 45 arranged as previously described in relation to FIG. 2 so that their centers of gravity are diametrically opposite each of the crankpins 40. Thus, rotation of the crankshaft-carried counterweights 45 produces centrifugal forces having one component that is vertical and acting along each cylinder axis in opposition to the acceleration and deceleration forces of each piston 42 to partially balance or cancel out the vertical forces of each piston assemblage.

The engine balancing system shown in FIG. 4 comprises a pair of identical, rotary, auxiliary counterweights 46 and 47 located on the exterior of the engine crankcase 31. Auxiliary counterweights 46 and 47 are mounted on shafts 48 and 49, respectively, at opposite ends thereof adjacent to end walls 33 and 32, respectively, in the same manner as that illustrated and described in FIG. 2. The shafts 48 and 49 extend through crankcase 31 and are supported in bearings 50 and 51 by end walls 32 and 33 for rotation in the same manner as that described for the auxiliary counterweights 16 and 17 of FIGS. 1–3. Shafts 48 and 49 and auxiliary counterweights 46 and 47 are thus spaced the same distance from the crankshaft axis and are positioned on diametrically opposite sides thereof. The shafts 48 and 49 also mounted toothed pulleys or sprockets 52 and 53, respectively, which as seen in FIG. 4 are in alignment with sprockets 38 and 39 of crankshaft 34 and camshaft 36. A double-sided timing belt 54 is trained around sprockets 38, 39, 52 and 53 in a manner similar to that shown in FIG. 1 so that auxiliary counterweights 46 and 47 both rotate in a direction opposite to that of crankshaft 34 and at crankshaft speed.

The dimensions and weights of counterweights 46 and 47 are preferably such that their combined centrifugal force resulting from rotation thereof is equal that of the combined conventional crankshaft-carried counterweights 45. Hence, the auxiliary counterweights 46 and 47 shown in FIG. 4 must produce twice as much centrifugal force as the auxiliary counterweights 16 and 17 of FIGS. 1–3 since they are employed with a twin cylinder engine. As a result, auxiliary counterweights 46 and 47 and crankshaft-carried counterweights 45 coact to offset the primary vertical inertial forces acting along the axes of pistons 42 resulting from their reciprocation in the same manner as previously described in relation to FIGS. 1–3. Also, since the direction of rotation of both externally mounted auxiliary counterweights 46 and 47 is opposite that of crankshaft 34 and at crankshaft speed, the horizontal components of the centrifugal force of the crankshaft-carried counterweights 45 are also substantially balanced or cancelled out, as previously described herein.

Further, the summation of the moments produced by crankshaft-carried counterweights 45 and auxiliary counterweights 46 and 47 is zero, and the summation of their centrifugal forces acts essentially along the path of the combined center of gravity of pistons 42. As seen in FIG. 4, the center of gravity for pistons 42 will be located between connecting rods 41. In contrast, the center of gravity for piston 12 in FIGS. 2–3 will be located in a plane passing through connection rod 11.

Figure 5:
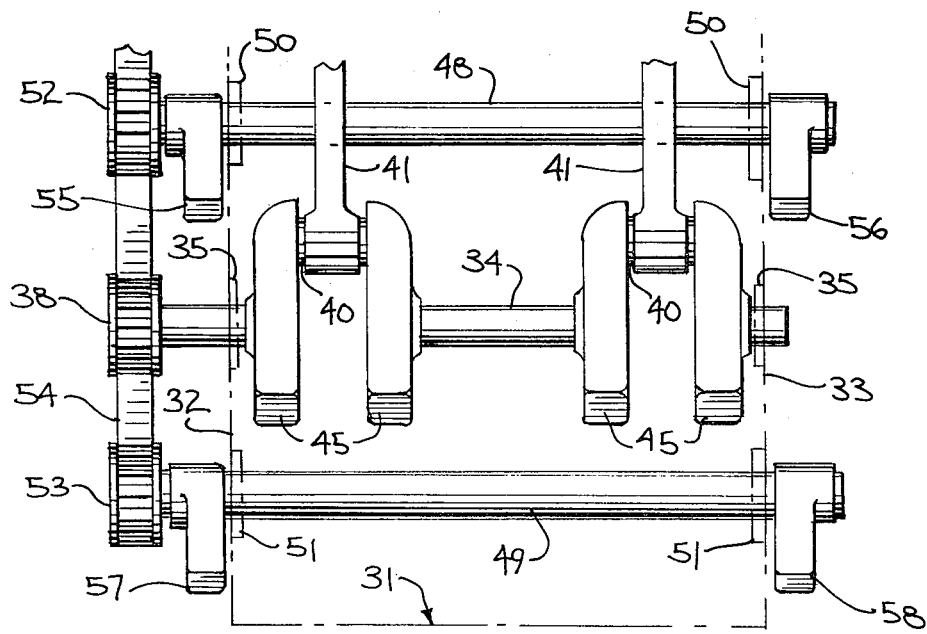
FIG. 5 is a fragmentary view similar to FIG. 3 illustrating an alternate form of the invention for use with even-firing in-line twin cylinder piston engines.

FIG. 5 shows another form of the engine balancing system of the present invention which may be utilized with in-line in phase twin cylinder engines. The arrangement shown in FIG. 5 is substantially identical to that shown in FIG. 4 except that in FIG. 5 shaft 49 projects beyond both end walls 32 and 33, and there are now four identical externally mounted auxiliary counterweights 55-58. Auxiliary counterweights 55-58 are securely mounted on shafts 48 and 49 in substantially the same manner as that described in relation to FIG. 3 so that they are positioned symmetrically with respect to the crankshaft axis. The dimensions and weight of the identical externally mounted auxiliary counterweights 55-58 are such that their combined centrifugal force resulting from rotation thereof equals that of the conventional crankshaft-carried counterweights 45. However, in the embodiment shown in FIG. 5 such auxiliary counterweights 55-58 each produce only one-half the centrifugal force of that of each auxiliary counterweight 46 and 47 shown in FIG. 4. Nevertheless, as is readily apparent, their combined centrifugal force equals that of the combined crankshaft counterweights 45. Hence, the auxiliary counterweights 55-58 shown in FIG. 5 operate in the same manner as previously described for auxiliary counterweights 46 and 47 of FIG. 4, and coact with the crankshaft counterweights 45 to substantially balance or cancel out the vertical and horizontal primary inertial forces of the two piston assemblages. Similarly the use of the four symmetrically positioned counterweights 55-58 of FIG. 5 instead of the two counterweights 46 and 47 of FIG. 4 does not produce any additional torque or moments to the system.

Several preferred embodiments of an improved engine balancing system have been shown and described herein for effectively balancing the primary intertial forces that causes objectional vibration in single cylinder or in-line in phase multi-cylinder engines without introducing any additional torque or moments into the system. It will be readily apparent to those skilled in the art, however, that various modifications can be made to the structure herein shown and described without departing from the spirit and scope of the invention. For example, it may only be necessary for some engines to utilize a single auxiliary counterweight and accomplish a part of the balancing objective of the present invention. Further, it will be readily apparent that the dimensions of the auxiliary counterweights may be varied depending upon the condition of overbalance desired. Also, the position of each auxiliary counterweight may be varied slightly depending upon the engine in order to avoid redesigning the engine block and still substantially accomplish the balancing objective of the present invention. For example, the auxiliary counterweights need not necessarily be exactly diametrically opposite one another, but rather may be offset slightly due to space limitations of the engine.

Various modes of carrying out the invention are contemplated as being within the scope of the following claims particularly pointing out and distinctly claiming the subject matter which is regarded as the invention.

We claim:

1. An engine of the reciprocating piston type in which a crankshaft that is journaled in opposite end walls of an engine block has crankpin means by which it is linked with the piston means of the engine and conventional counterweight means fixed to the crankshaft diametrically opposite its crankpin means, said engine being characterized by:

A. first and second auxiliary shafts extending through the engine block and rotatably journaled in the opposite end walls thereof, each of said auxiliary shafts includes an end portion extending exteriorly of the engine block from one of said end walls, said auxiliary shafts define rotational axes that are fixed with respect to and parallel with the crankshaft axis on diametrically opposite sides thereof in a common plane with the crankshaft axis at equal distances therefrom which is greater than the radius of the circumferential path of the conventional counterweight means;

B. first and second auxiliary counterweights in addition to said conventional counterweight means mounted on respective end portions of said auxiliary shafts exteriorly of the engine block adjacent said one end wall; and C. means for imparting rotation to said auxiliary counterweights in the direction opposite to that of the crankshaft but at the same speed, comprising:

(1) a toothed pulley coaxially fixed with respect to the auxiliary counterweight on each of said auxiliary shafts exteriorly of said engine block, (2) a toothed pulley coaxially fixed with respect to the crankshaft exteriorly of said engine block, said toothed pulleys being of the same diameter, and (3) an endless flexible motion transmitting element having opposite faces, each of which is drivingly engageable with the circumference of a toothed pulley, said flexible motion transmitting element being trained over all of said toothed pulleys with one face thereof engaging the toothed circumference of the pulley that is fixed with respect to the crankshaft and the opposite face thereof engaging the toothed circumference of the other of said pulleys, so that when the engine is running, said auxiliary counterweights rotate at crankshaft speed but in the opposite direction from that of the crankshaft, and said endless flexible motion transmitting element holding said auxiliary counterweights in such angular relationship to the conventional counterweight means that the inertial forces produced by rotation of the conventional counterweight means and of said auxiliary counterweights combine to substantially balance the inertial forces resulting from reciprocation of the piston means when the latter approaches either terminus of its stroke, whereas at substantially the point the piston means passes in either direction through the midpoint in its stroke, the inertial forces resulting from rotation of said auxiliary counterweights oppose the inertial forces resulting from rotation of said conventional counterweight means, and the summation of the moments produced by the conventional counterweight means and the additional counterweight means is zero and the summation of the centrifugal forces of all counterweights acts essentially along the path of the center of gravity of the piston means.

2. The engine of claim 1, wherein the end portions of said auxiliary shafts extend from opposite end walls of the engine block so that said auxiliary counterweights are on opposite sides of the engine block.

3. The engine of claim 1, wherein said auxiliary counterweights are identical.

4. The engine of claim 1, further characterized by the fact that the engine has a camshaft parallel to its crankshaft and spaced therefrom, and further by a toothed pulley that is coaxially fixed with respect to the camshaft, and by the fact that said endless flexible motion transmitting element is trained over the toothed camshaft pulley with stretches thereof extending tangentially therefrom to the toothed pulleys of said auxiliary counterweights.

5. The engine of claim 1, wherein the end portions of said auxiliary shafts extend from the same end wall of said engine block, and the toothed auxiliary shaft pulleys are mounted on said end portions with the auxiliary counterweights located between said toothed auxiliary shaft pulleys and said same end wall.

* * * * *